United States Patent [19]

Iida et al.

[11] 4,151,557
[45] Apr. 24, 1979

[54] TELEVISION RECEIVER OPERATING MODE SELECTOR

[75] Inventors: Mikio Iida, Tokyo; Mitsuru Hosoya, Fujisawa, both of Japan

[73] Assignee: Sony Corporation, Tokyo, Japan

[21] Appl. No.: 804,764

[22] Filed: Jun. 8, 1977

[30] Foreign Application Priority Data

Jun. 11, 1976 [JP] Japan .................................. 51-68956
Jun. 11, 1976 [JP] Japan .................................. 51-76986

[51] Int. Cl.² .......................... H04N 5/44; H04N 5/76
[52] U.S. Cl. ...................................... 358/188; 358/181; 358/127
[58] Field of Search ............... 358/1, 4, 22, 54, 127, 358/181, 185, 188, 191

[56] References Cited
U.S. PATENT DOCUMENTS

| | | | |
|---|---|---|---|
| 2,535,471 | 12/1950 | White et al. | 358/181 |
| 2,825,755 | 3/1958 | Baracket | 358/181 |

Primary Examiner—John C. Martin
Attorney, Agent, or Firm—Lewis H. Eslinger; Alvin Sinderbrand

[57] ABSTRACT

A television receiver for selectively reproducing either a picture of a television signal or an external video signal, having a television tuner using a signal controlled reactance device as a tuning element, a video detector coupled to said television tuner for producing a television video signal at a television video signal output terminal, a channel selector having a plurality of channel selecting switches for supplying a tuning signal corresponding to a selected channel to said signal controlled reactance device of said television tuner, an external video signal input terminal, a gate circuit for selecting one video signal from said television video signal input terminal or said external video signal input terminal, a flip-flop circuit for controlling said gate circuit, and a mode control switch for triggering said flip-flop.

4 Claims, 6 Drawing Figures

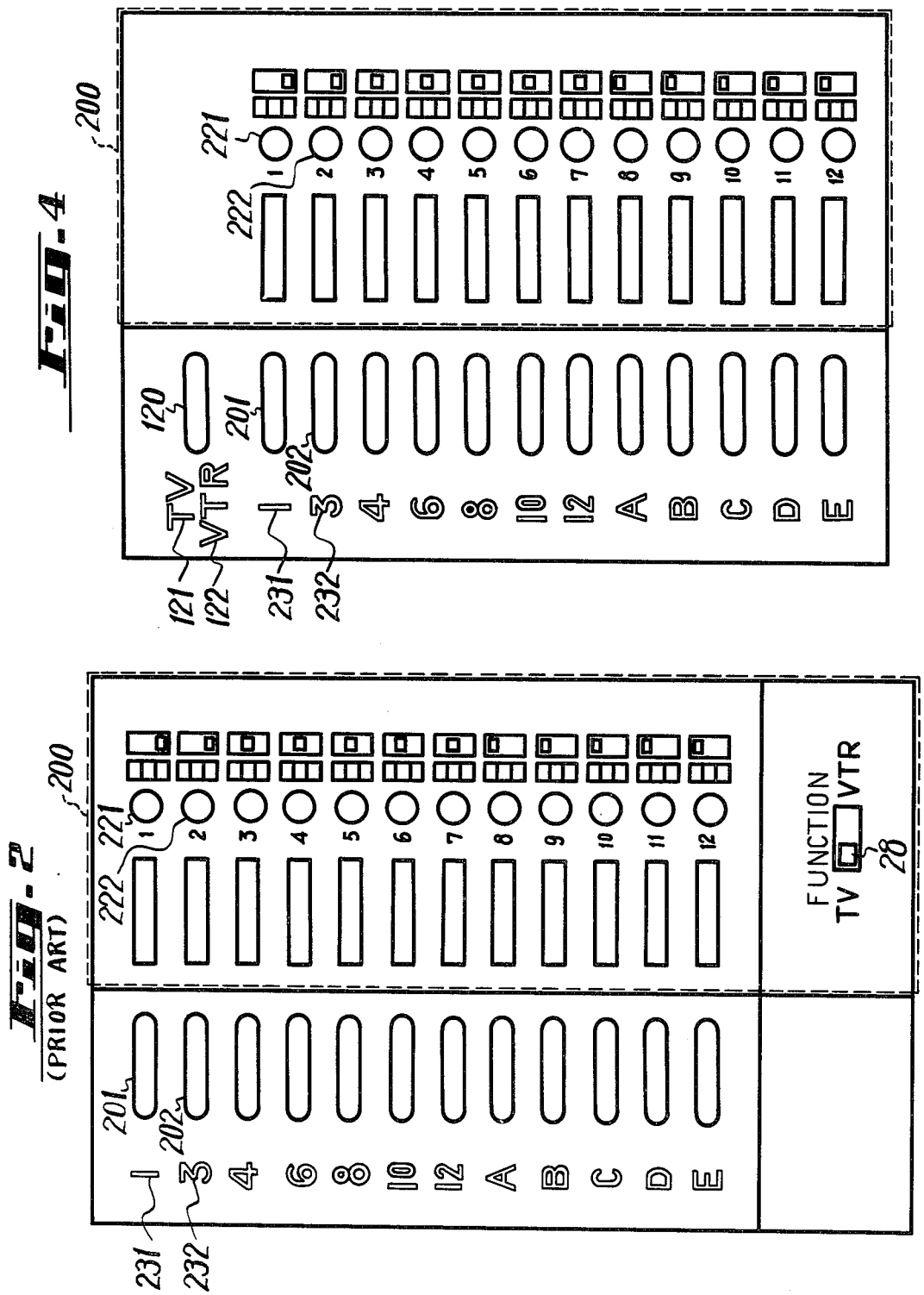

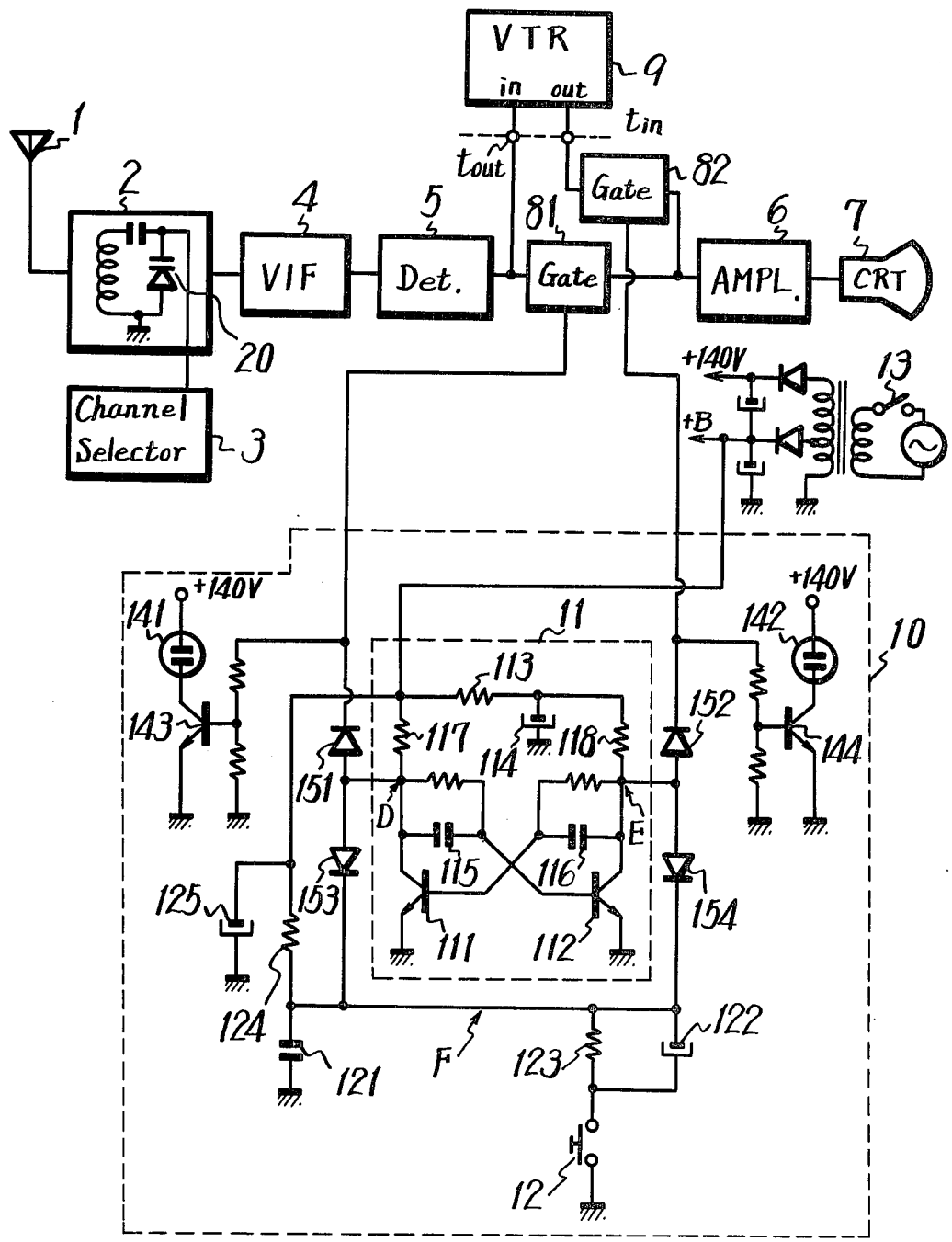

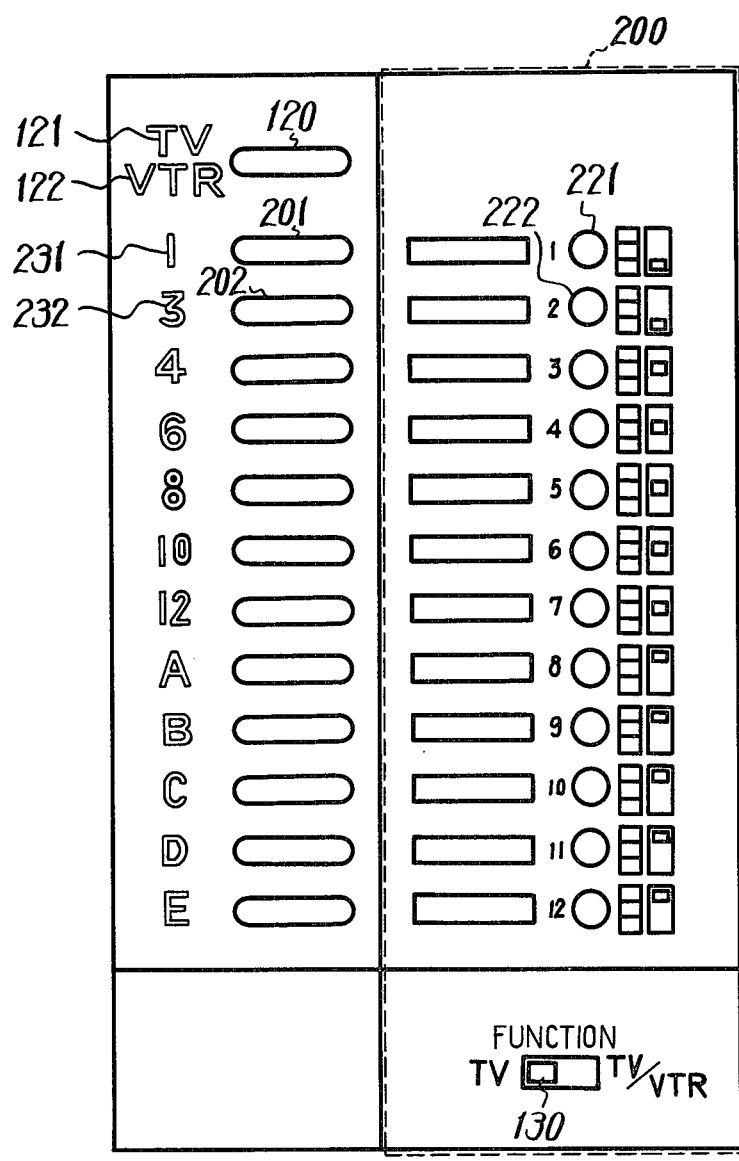

TELEVISION RECEIVER OPERATING MODE SELECTOR

BACKGROUND OF THE INVENTION

1. Field of the Invention

The present invention relates generally to a television receiver, and is directed more particularly to a television receiver having a mode changing device to changeably supply a received television signal or an external video signal to its cathode ray tube.

2. Description of the Prior Art

A prior art television receiver of this kind is shown in FIG. 1. In FIG. 1, a broadcast television signal is received by an antenna 1, then selected by a tuner 2 and a channel selector 3, amplified by an intermediate frequency amplifier 4, detected by a video detector 5, and connected to a change-over terminal a of a change-over switch 8, and to an external output terminal $t_{out}$. When the switch 8 is contacted with the terminal a, the television signal from the video detector 5 is supplied through a video amplifier 6 to a cathode ray tube 7.

The switch 8 is used to select between the television signal fed to the terminal a and an external signal fed to a terminal b. A signal from a video tape recorder, television camera or the like is generally used as the external signal. In the prior art example shown in FIG. 1, a video tape recorder 9 is used, and the terminal b is connected through an external input terminal $t_{in}$ to the output terminal of video tape recorder 9. The external output terminal $t_{out}$ is connected to the input terminal of video tape recorder 9.

The tuner 2 is of a voltage controlled type and has an inner reactance element (for example, a variable capacitance diode) 20, so that when a voltage applied across the both ends thereof is varied, a channel of a predetermined frequency can be selected. The channel selector 3 serves to apply a voltage in accordance with a channel to be selected to the element 20 of tuner 2. To this end, the channel selector 3 includes channel selecting switches 301, 302, . . . , switching transistors 311, 312, . . . , channel selecting voltage preset variable resistors 321, 322, . . . , channel selecting display neon lamps 331, 332, . . . , diodes 341, 342, . . . , and a channel selecting block 30 including a pulse generator 31, a counter 32 and a decoder 33.

FIG. 2 shows a part of the control portion of the television receiver shown in FIG. 1. The control portion is located, for example, on one side of the front portion of the television receiver. Usually, the dotted line block 200 of the control portion shown in FIG. 2 is covered with a lid (not shown). Channel selecting buttons 201, 202, . . . are push buttons of the self-return type. Thus, only when the buttons 201, 202, . . . are pushed down manually are, the switches 301, 302, . . . which correspond to buttons 201, 202, . . . , respectively, shown in FIG. 1, closed or made ON. These buttons 201, 202, . . . can be formed as contact electrodes of touch switches. At channel display portions 231, 232, . . . there are provided figures, letters or the like for displaying the selected channel by lighting one of neon lamps 331, 332, . . . shown in FIG. 1. These operating buttons 201, 202, . . . and channel display portions 231, 232, and so on . . . are exposed for direct viewing. However on the portion 200, which is covered by the lid, there are located buttons which are used less frequently. That is, preset knobs 221, 222, . . . , which correspond to the variable resistors 321, 322, . . . for presetting the selecting voltage, and so on are located on the covered portion 200 because if they are preset at predetermined channels, almost no adjustment for them is necessary. A slide switch 28 for selecting the television signal receiving mode or the video tape recorder reproducing mode is also located on the covered portion 200.

On some prior art television receivers controls, which are used less frequently, are located either on the side panel or back panel of the receiver, and usually apart from the channel selecting buttons 201, 202, . . . , mainly to enhance the appearance of the television receiver.

With the above prior art television receivers, if the mode changing switch 28 is switched to the video tape recorder side, no picture will appear on the screen of the television receiver even though the power switch is closed and any one of the channel selecting buttons 201, 202, . . . is pushed down. In this case, if the slide switch 28 is covered with the lid or the like as in the prior art, a user may not understand and conclude that the television receiver is out of order.

Further, with a television receiver of the prior art the mode changing operation is different from the channel changing operating, the operation efficiency is poorer and it is troublesome to transfer from the video tape recorder output to a desired television channel.

OBJECTS AND SUMMARY OF THE INVENTION

An object of the present invention is to provide a television receiver free from the defects inherent to the prior art.

Another object of the present invention is to provide a television receiver which is easily operable and difficult to operate erroneously.

According to an aspect of the present invention there is provided a television receiver for selectively reproducing a picture of a television signal or an external video signal which comprises a television tuner, a video detector coupled to said television tuner for producing a television video signal at a television video signal output terminal, an external video signal input terminal, a gate circuit for selecting one video signal from said television video signal input terminal or said external video signal input terminal, a flip-flop circuit for controlling said gate circuit, and a mode control switch for triggering said flip-flop.

The other objects, features and advantages of the present invention will become apparent from the following description taken in conjunction with the accompanying drawings.

BRIEF DESCRIPTION OF THE DRAWINGS

FIG. 2 is a front view showing the control portion of the prior art television receiver;

FIG. 3 is a circuit diagram showing an example of the television receiver according to the invention;

FIG. 4 is a front view showing the control portion of the television receiver of the invention;

FIG. 6 is a front view showing the control portion of the embodiment of FIG. 5.

DESCRIPTION OF THE PREFERRED EMBODIMENTS

The present invention will be hereinafter described with reference to the drawings.

Figure 1:
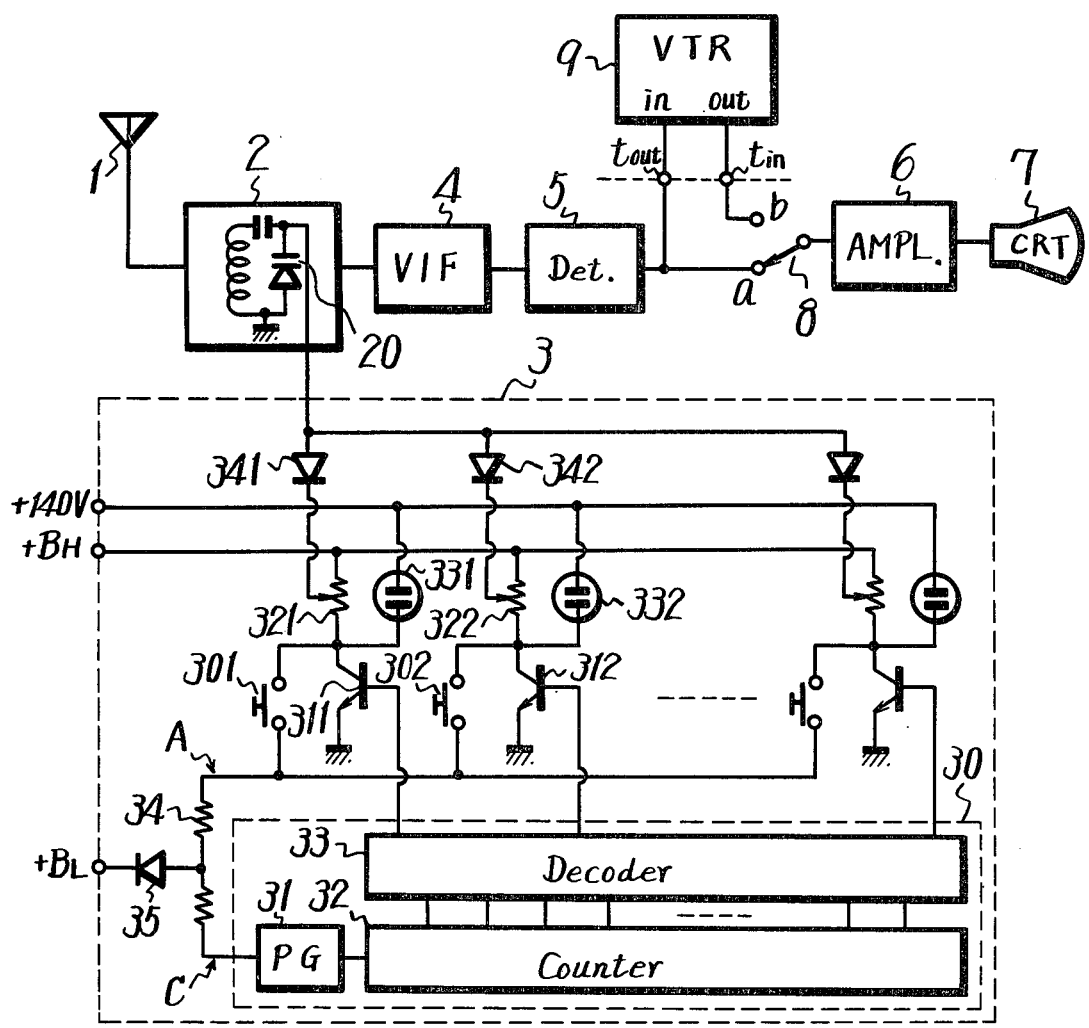
FIG. 1 is a circuit diagram showing an example of the prior art television receivers.

A first example of the television receivers according to the invention will be described with reference to FIGS. 3 and 4 in which the parts similar to those of FIGS. 1 and 2 are marked with the same reference numerals and for which the description is omitted.

In the example of FIG. 3, the television signal from video detector 5 is supplied to the external output terminal $t_{out}$ and to the input terminal of gate circuit 81, and the external signal from the external input terminal $t_{in}$ (in this case, the signal from the video tape recorder 9) is supplied to the input terminal of gate circuit 82. The output terminals of gate circuits 81 and 82 are connected through video amplifier 6 to the cathode ray tube 7, and the input and output terminals of video tape recorder 9 as an external instrument are connected to terminals $t_{out}$ and $t_{in}$, respectively.

The gate circuits 81 and 82 are supplied, at their control terminals, with mode changing signals from a mode changing circuit 10. This mode changing circuit 10 is provided with a flip-flop circuit 11, which produces mode changing signals reverse in phase, a switch 12 supplying a trigger signal to the flip-flop 11 to trigger the latter, switch 13 for controlling the power supply for the mode changing circuit 10, and neon lamps 141 and 142 for displaying the selected mode. In the described embodiment, the flip-flop 11 is supplied with the trigger signal by the switch 12, but it is possible to supply the trigger signal from a remote control device.

The control portion of the television receiver according to the invention is constructed, for example, as shown in FIG. 4. In this example, channel selecting buttons 201, 202, ..., channel display portions 231, 232, ..., preset knobs 221, 222 ... and so on are substantially same as those shown in FIG. 2. For this reason their description is omitted. At a predetermined position of the column of channel selecting buttons 201, 202, ..., in the illustrated example, above the upper most button 201, there is provided an operation button 120 for mode selection. This operation button 120 is, for example, an automatic return push button and corresponds to switch 12 (refer to FIG. 3). It is also possible to use contact electrodes of touch switches as the buttons 120, 201, 202 .... TV (television) mode display portion 121 and VTR (video tape recorder) mode display portion 122 are provided near the operation button 120 and neon lamps 141 and 142 (see FIG. 3) are provided behind the display portions 121 and 122, respectively.

Now, the operation of the television receiver according to the invention will be described. When the power switch 13 is closed, +B voltage is applied to flip-flop circuit 11. At this time, due to the tie constant circuit formed of a resistor 113 and capacitor 114 in flip-flop circuit 11, the rising-up of the voltage at point E is delayed more than at point D. Thus, in the flip-flop circuit 11, transistor 112 switches ON first to lower the voltage at point E and thereby switch transistor 111 OFF. Therefore, the voltage at point D becomes the voltage of +B voltage source. This voltage at point D is fed through diode 151 to the control terminal of gate circuit 81 as a control signal, so that the TV signal from video detector 5 is supplied through gate circuit 81 to video amplifier 6. At this time transistor 143, whose base is connected to diode 151, becomes ON and hence neon lamp 141 is lit for displaying the TV mode. By the previously described operation, when the power switch 13 is closed, the television receiver signal is chosen for output to the amplifier 6 and cathode ray tube 7, thereby eliminating possible misconceptions on the part of a user that the television receiver might be out of order.

Next, the channel selection operation under the TV mode will be described with reference to FIG. 1. When a desired channel, for example, a first channel is selected, only the first transistor 311 is in the ON-state and the remaining transistors 321, ... are in OFF-state. At this time, only the output voltage of the variable resistor 321 is preset to a value lower than $+B_H$ voltage, but the remaining variable resistors 322, ... are of $+B_H$ voltage. Accordingly, only the didode 341 is conductive and the remaining diodes 342, ... are non-conductive. Thus, the variable reactance element 20 of tuner 2 is supplied with the predetermined preset voltage from variable resistor 321 through diode 341. At this time, only the neon lamp 331 is lit and the remaining neon lamps 332, ... are not lit. Also, the voltages at points A and C are both substantially zero.

Next, if another channel switch, for example, second channel switch 302 is made ON, since transistor 312 is in OFF-state, $+B_H$ voltage is supplied to point A through variable resistor 322 and switch 302. The point A is connected through resistor 34 and diode 35 to $B_L$ voltage source $(+B_L < +B_H)$, so that the point C is supplied with $+B_L$ voltage. Therefore, pulse generator 31 is driven to make switching transistors 311, 312, ... ON sequentially, one by one. The transition time period of ON operation for transistors 311, 312, ... is selected to be about 0.7 ms. This time period is sufficiently shorter than the time period that switch 302, is manually closed so that all the transistors 311, 312, ... can be made ON at least once. When transistors 311, 312, ... are sequentially switched ON while switch 302 is closed or ON, transistor 312, connected in parallel to switch 302, is also switched ON, the voltage at point A becomes zero and hence so does the voltage at point C. As a result, pulse generator 31 stops its operation and transistor 312 is held ON. The other transistors 311 and so on are held OFF, so that the second channel is selected and neon lamp 332 is lit to display the selected channel. At this time, the flip-flop circuit 11 of mode changing circuit 10 is in TV mode and neon lamp 141 is lit.

When transistor 111 of flip-flop circuit 11 is OFF, transistor 112 is ON. In this condition, if the button 120 is pushed to closed switch 12, point F is grounded through the parallel circuit of capacitor 122 and resistor 123 and through the closed switch 12. The voltage at point F is varied in response to the current flowed into capacitor 122, but becomes a value determined by resistors 123 and 124 dividing +B voltage. Since the voltage at point D is substantially +B voltage, diode 153 is made conductive. Thusly, the voltage at point D is lowered to that at point F. A capacitor 115 is charged up by +B voltage source, so that the base voltage of transistor 112 is lower than that at point D by substantially +B voltage and is a negative voltage. As a result, transistor 112 becomes OFF and the voltage at point E becomes high to switch transistor 111 ON. When the pushing of operation button 120 is stopped, the switch 12 becomes OFF automatically. The voltage at point E becomes +B voltage substantially and is applied through diode 152 to the control terminal of gate circuit 82 as a control voltage. Thus, the VTR signal from VTR 9 is fed through gate circuit 82 to video amplifier 6. At this time, transistor 144, whose base is connected to diode 152, becomes ON and hence neon lamp 142 is lit for displaying the VTR mode.

In the mode changing circuit 10, since a capacitor 121 having a relatively large capacity is connected to the point F which is supplied with the trigger signal, impulse voltages produced by discharge in CRT (cathode ray tube) and so on are absorbed to avoid error operation. Further, the fluctuation of +B voltage is compensated for by capacitor 125.

As may be understood from the above description, with the television receiver of the present invention, the mode change is carried out electronically by using the flip-flop circuit and the mode changing buttons in a manner similar to the channel selecting buttons. Further, in the described embodiment of the present invention the channel selecting buttons and mode changing buttons are located near each other. Therefore, the mode changing operation can be carried out easily and similarly to the channel selecting operation. As a result, the operating characteristics are improved and fewer errors occur.

Another example of the invention will be described with reference to FIGS. 5 and 6.

Figure 5:
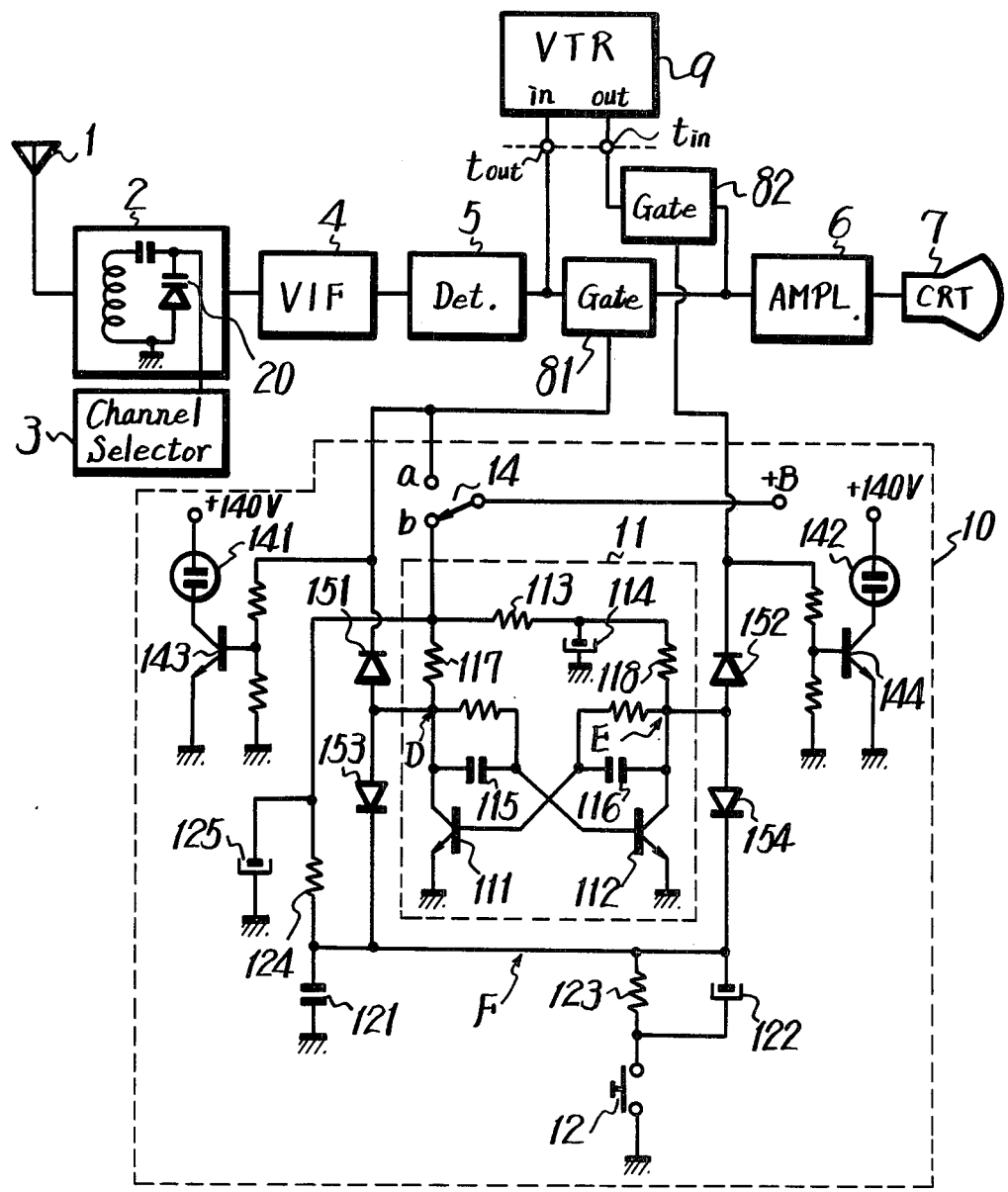
FIG. 5 is a circuit diagram showing another example of the invention.

FIG. 5 is a circuit diagram showing a TV receiver of the invention and FIG. 6 is a front view of the control portion of the TV receiver shown in FIG. 5. In FIGS. 5 and 6, elements similar to those shown in FIGS. 1 to 4 are marked with the same reference numerals and their description is omitted.

As shown in FIG. 5, the control terminals of gate circuits 81 and 82 are supplied with mode changing signals from the mode changing circuit 10. This mode changing circuit 10 includes the flip-flop circuit 11 which produces mode changing signals opposite in phase, a switch 12 producing the trigger signal to make the flip-flop circuit 11 carry out its reversing operation, a switch 14 which selects either the fixed TV mode or the TV/VTR change mode, and neon lamps 141 and 42 for displaying the selected mode.

The control portion of the TV receiver of the second example is shown in FIG. 6. In this case, since the channel selection buttons 201, 202, . . . channel display portions 231, 232, . . . and preset knobs 221, 222, . . . are substantially the same as those of the first example, their description is omitted.

In the example shown in FIG. 6, at a predetermined position of the portion 200 covered with the lid, there is provided a slide switch 130 which selects one of fixed TV mode and TV/VTR change mode. This slide switch 130 corresponds to switch 14.

The description will be given on the operation of the second example according to the invention. When slide switch 130 is moved to the TV mode as shown in FIG. 6, switch 14 shown in FIG. 5 is changed to a fixed contact a and hence +B voltage is applied to the control terminal of gate circuit 81. At this time, flip-flop circuit 11 is not supplied with voltage, so that it is inoperative. Thus, only the gate circuit 81 is conductive to supply the TV signal from video detector 5 to the CRT 7 through video amplifier 6. At this time, even if the mode changing button 120 is operated to make switch 12 ON, the flip-flop circuit 11 is not driven and the TV mode is still held. This condition is suitable when no external video signal is supplied to the TV receiver.

When the slide switch 130 is moved to the TV/VTR change mode, the switch 14 is changed to a contact b and then +B voltage is applied to the flip-flop circuit 11 as shown in FIG. 5. At this time, due to the time constant circuit consisting of resistor 113 and capacitor 114, the rising-up of voltage at point E is delayed more than at point D. Thus, transistor 112 is made ON first, lowering the voltage at point E, so that transistor 111 is made OFF and the voltage at point D becomes substantially +B voltage. The voltage at point D is fed through diode 151 to the control terminal of gate circuit 81 as the mode changing signal. Thus, the TV signal from video detector 5 is fed through gate circuit 81 to video amplifier 6. At this time, transistor 143 is made ON to light neon lamp 141 for displaying the TV mode.

Under the state that transistor 111 of flip-flop circuit 111 is in the OFF-state and transistor 112 is in the ON-state, if the operation button 120 is operated to make switch 12 ON, similar to the example shown in FIG. 3, transistor 112 becomes OFF and the signal from VTR 9 is fed through gate circuit 82 to video amplifier 6. At this time, transistor 144 turns ON to light neon lamp 142 for displaying the VTR mode.

As may be apparent from the above description, in the case that the VTR is not connected to the TV receiver and only the TV signal is received, when slide switch 130 is fixed to the TV side to change switch 14 to the contact a, the TV mode is engaged irrespective of the button 12 of mode changing operation.

While, in the case that the VTR is connected to the TV receiver, if the slide switch 130 is moved to the TV/VTR mode to change switch 14 to the contact b, the changing between the TV mode and VTR mode can be carried out easily by operating the mode changing button 120. This mode changing is performed similarly to the channel selection, so that the operating characteristics are improved. In this case, the selected mode is displayed by display portions 121 and 122.

It will be apparent that many modifications and variations could be effected by one skilled in the art without departing from the spirits or scope of the novel concepts of the present invention.

We claim as our invention:

1. A television receiver for reproducing a picture of a television signal or an external video signal, selectively, comprising:
   a television tuner;
   a video detector coupled to said television tuner for producing a television video signal at a television video signal output terminal;
   an external video signal input terminal;
   a gate means for selecting one video signal from said television video signal output terminal or said external video signal input terminal;
   a flip flop circuit for controlling said gate means, said flip flop circuit having one state corresponding to the selection of said television video signal and one state corresponding to the selection of said external video signal, said flip flop circuit further having asymmetrical rising-up characteristics for controlling said gate means to select said television video signal when electrical power is first provided to said flip flop circuit;
   means for triggering said flip flop circuit to change the selection of video signals.

2. A television receiver as claimed in claim 1; wherein said means for triggering said flip flop circuit includes a push-button switch.

3. A television receiver as claimed in claim 1; wherein lamps are provided for indicating the selection between said television video signal and said external video signal.

4. A television receiver according to claim 1; wherein said television tuner includes a signal controlled reactance device, and further including a channel selecting means having a plurality of channel selecting switches for supplying a tuning signal corresponding to a selected channel to said signal controlled reactance device.

* * * * *